US010927787B2

(12) United States Patent
Suda

(10) Patent No.: US 10,927,787 B2
(45) Date of Patent: Feb. 23, 2021

(54) PISTON FOR INTERNAL COMBUSTION ENGINE

(71) Applicant: SUZUKI MOTOR CORPORATION, Shizuoka (JP)

(72) Inventor: Naoyuki Suda, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 16/574,470

(22) Filed: Sep. 18, 2019

(65) Prior Publication Data
US 2020/0088128 A1 Mar. 19, 2020

(30) Foreign Application Priority Data

Sep. 18, 2018 (JP) .............................. JP2018-173794

(51) Int. Cl.
F02F 3/00 (2006.01)
F02F 1/04 (2006.01)
F02F 3/02 (2006.01)
F02F 3/10 (2006.01)
F16J 1/08 (2006.01)
F16J 1/04 (2006.01)

(52) U.S. Cl.
CPC .............. *F02F 3/027* (2013.01); *F02F 3/105* (2013.01); *F16J 1/04* (2013.01); *F16J 1/08* (2013.01)

(58) Field of Classification Search
CPC ...... F02F 3/00; F02F 3/105; F02F 1/20; F02F 3/022; F02F 3/027; F02F 3/10
See application file for complete search history.

(56) References Cited

U.S. PATENT DOCUMENTS

| 6,345,569 | B1* | 2/2002 | Take | F02F 3/022 92/208 |
| 6,357,341 | B1* | 3/2002 | Watanabe | F02F 3/00 123/193.6 |
| 8,640,669 | B2 | 2/2014 | Nakazawa et al. | |
| 2011/0139114 | A1* | 6/2011 | Nakazawa | F02F 3/105 123/193.6 |
| 2015/0047498 | A1* | 2/2015 | Takada | F02F 3/0084 92/155 |

(Continued)

FOREIGN PATENT DOCUMENTS

JP 4749398 B2 8/2011

Primary Examiner — Long T Tran
(74) Attorney, Agent, or Firm — Rothwell, Figg, Ernst & Manbeck, P.C.

(57) ABSTRACT

A piston for an internal combustion engine has a plurality of recesses formed in a skirt including an upper, a lower, and a central portion. The recesses in the upper portion close to an upper boundary of the central portion have lower ends located upwardly at a given distance away from the upper boundary. The recesses in the central portion close to the upper boundary have upper ends located downwardly at the given distance away from the upper boundary. The recesses in the lower portion close to the lower boundary have upper ends located downwardly at the given distance away from the lower boundary. The recesses in the central portion closer to the lower boundary have lower ends located upwardly at the given distance away from the lower boundary. This enhances lubrication between the piston and an inner wall of a cylinder bore and reduces a friction loss of the piston.

4 Claims, 15 Drawing Sheets

(56) References Cited

U.S. PATENT DOCUMENTS

| | | | |
|---|---|---|---|
| 2015/0184612 A1* | 7/2015 | Takada | F02F 3/0084 |
| | | | 123/193.6 |
| 2016/0348611 A1* | 12/2016 | Suda | F02F 3/022 |
| 2017/0350344 A1* | 12/2017 | Oso | F02F 3/10 |
| 2019/0338723 A1* | 11/2019 | Takeda | F02F 1/18 |

* cited by examiner

FIG. 2
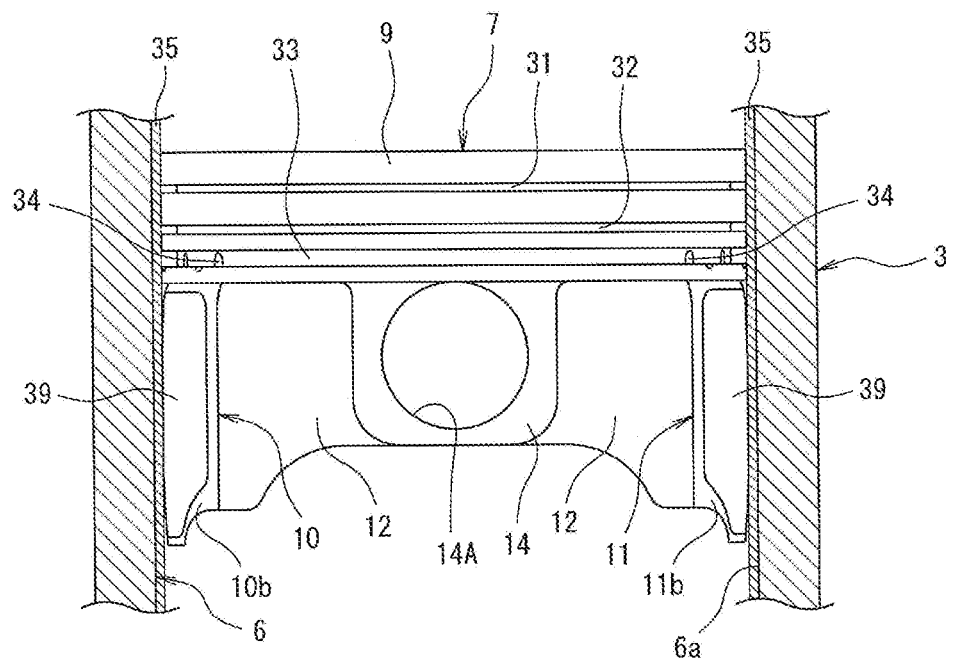
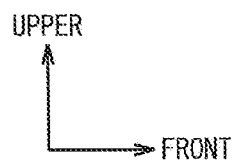

FIG. 5
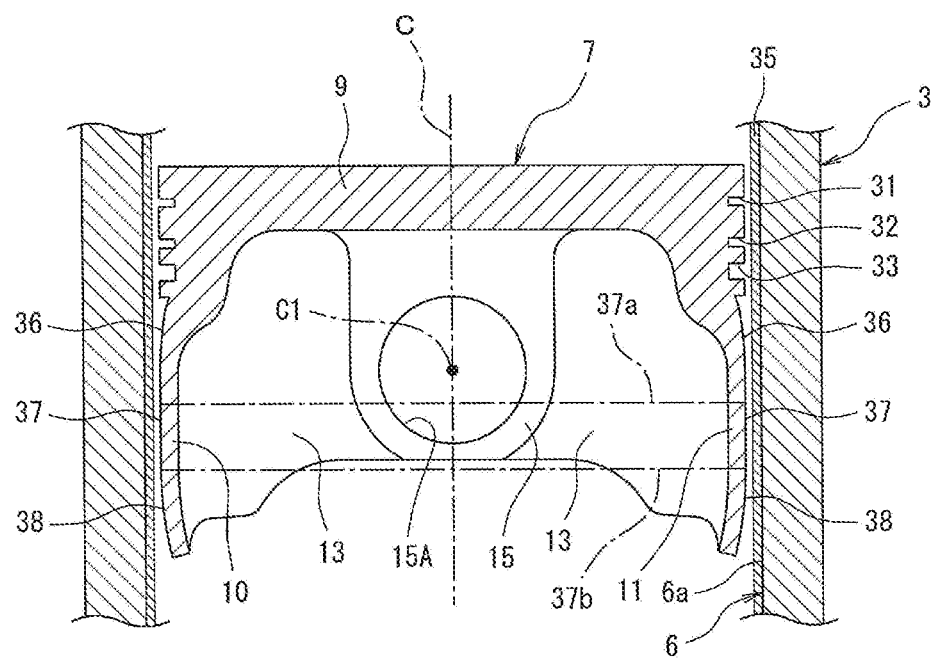
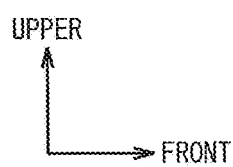

PISTON FOR INTERNAL COMBUSTION ENGINE

BACKGROUND OF THE INVENTION

1 Technical Field

The present invention generally relates to a piston for an internal combustion engine. The present application claims priority to Japanese Patent Application No. 2018-173794 filed on Sep. 18, 2018, the entire content of which is being incorporated herein by reference.

2 Background Art

Japanese Patent No. 4749398 discloses a piston which is reciprocable in a cylinder bore of an internal combustion engine. The piston includes a pair of skirts extending downward from a piston body, a pair of side walls connecting the skirts together, and a pair of piston-pin bosses formed in the side walls for retaining the piston.

The skirts are each formed in a barrel shape whose center in an axial direction of the piston has the largest diameter for minimizing adverse thermal effects thereon. Each of the skirt includes a skirt barrel body with a surface extending parallel to the center axis of the piston body and a first small-diameter portion shaped to have a distance between itself and the center axis of the piston body which continuously decreases in a downward direction from a first boundary line that is a lower end of the skirt barrel body.

Each of the shirt also includes a second small-diameter portion shaped to have a distance between itself and the center axis of the piston body which continuously decreases in an upward direction from a second boundary line that is an upper end of the shift barrel body.

Each of the skirts has an outer surface with a resin-coated layer. The resin-coated layer has a plurality of oil sumps formed in an entire outer surface thereof in the shape of recesses. The oil sumps are arranged at regular intervals away from each other. The piston retains oil in the oil sumps for reducing a frictional resistance to which the piston is subjected.

The above piston for the internal combustion engine, however, faces a drawback in that some of the oil sumps lying on the first boundary line and the second boundary line may retain an insufficient amount of oil.

The shirts are required to have a flat area around the sumps in order for a dynamic pressure to create an oil film. The dynamic pressure in the sumps located on the boundary lines leaks outside the sumps in a circumferential direction of the piston, so that it does not contribute to growth of the oil film, thereby resulting in a lowered degree of lubrication between the inner wall of the cylinder bore and the piston, which may increase a loss of motion arising from the friction.

SUMMARY OF THE INVENTION

The invention was made in view of the above problem. It is an object to provide a piston for an internal combustion engine which is capable of improving the degree of lubrication and decreasing a friction loss of kinetic energy of the piston.

According to one aspect of the invention, there is provided a piston for an internal combustion engine which comprises: (a) a piston body which is reciprocable relative to an inner wall of a cylinder bore; (b) a pair of skirts which extend downward from the piston body; (c) a pair of piston pin bosses which retains a piston pin; (d) a pair of side walls which connect the skirts together; and (e) resin-coated layers disposed on surfaces of the skirts which face the inner wall of the cylinder bore. Each of the skirts includes a central skirt portion, an upper skirt portion, and a lower skirt portion. The central skirt portion is a central portion of the skirt in a center axial direction of the piston body, has a largest diameter, and also has a surface area extending parallel to a center axis of the piston body. The upper skirt portion is curved to have an outer diameter which gradually decreases from an upper boundary of the central skirt portion toward the center axis of the piston body above the upper boundary. The lower skirt portion is curved to have an outer diameter which gradually decreases from a lower boundary of the central skirt portion toward the center axis of the piston body below the lower boundary. Each of the resin-coated layers has formed therein a plurality of recesses which retain oil therein. Ones of the recesses which are arranged close to the upper boundary or the lower boundary are located at a given distance away from the upper boundary or the lower boundary.

BENEFICIAL EFFECTS OF THE INVENTION

The above invention enhances lubrication between the piston and the inner wall of the cylinder bore and reduces the friction loss of the piston.

BRIEF DESCRIPTION OF THE DRAWINGS

FIG. 2 is a view which illustrates an embodiment of a piston for the internal combustion engine in the invention and also shows a cylinder bore of the piston.

FIG. 5 is a view which illustrates an embodiment of a piston for the internal combustion engine in the invention and a sectional view, as taken along the line IV-IV in FIG. 3.

EMBODIMENT FOR CARRYING OUT THE INVENTION

A piston for an internal combustion engine according to an embodiment of the invention comprises: (a) a piston body which is reciprocable relative to an inner wall of a cylinder bore; (b) a pair of skirts which extend downward from the piston body; (c) a pair of piston pin bosses which retains a piston pin; (d) a pair of side walls which connect the skirts together; and (e) resin-coated layers disposed on surfaces of the skirts which face the inner wall of the cylinder bore. Each of the skirts includes a central skirt portion, an upper skirt portion, and a lower skirt portion. The central skirt portion is a central portion of the skirt in a center axial direction of the piston body, has a largest diameter, and also has a surface area extending parallel to a center axis of the piston body. The upper skirt portion is curved to have an outer diameter which gradually decreases from an upper boundary of the central skirt portion toward the center axis of the piston body above the upper boundary. The lower skirt portion is curved to have an outer diameter which gradually decreases from a lower boundary of the central skirt portion toward the center axis of the piston body below the lower boundary. Each of the resin-coated layers has formed therein a plurality of recesses which retain oil therein. Ones of the recesses which are arranged close to the upper boundary or the lower boundary are located at a given distance away from the upper boundary or the lower boundary.

The above structure of the piston enhances lubrication between the piston and the inner wall of the cylinder bore and reduces the friction loss of the piston.

EMBODIMENT

A piston for an internal combustion engine according to an embodiment of the invention will be described below with reference to the drawings.

FIGS. 1 to 15 are views which illustrate the piston for the internal combustion engine according to the embodiment of the invention. In FIGS. 1 to 9, and 12, a vertical, a longitudinal, and a lateral direction are based on the internal combustion engine mounted in a vehicle. A direction perpendicular to the longitudinal direction is the lateral direction. A height-wise direction of the internal combustion engine is the vertical direction.

The structure will first be described.

Figure 1:
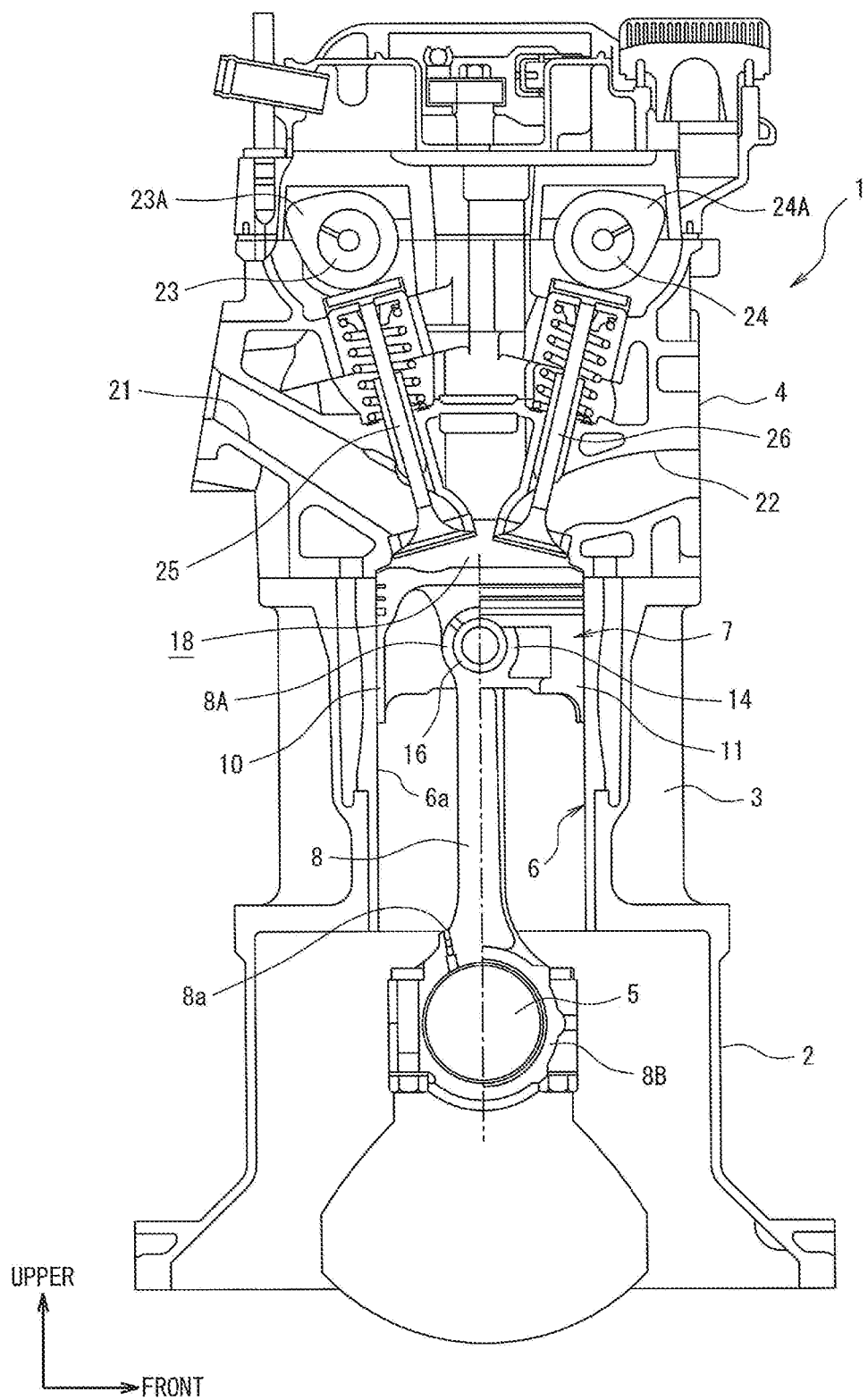
FIG. 1 is a structural view which illustrates an embodiment of a piston for the internal combustion engine in the invention and also shows an internal combustion engine.

In FIG. 1, the engine 1 that is an internal combustion engine mounted in a vehicle includes the cylinder block 3 integrally equipped with the crankcase 2 and the cylinder head 4 attached to an upper end of the cylinder block 3.

The pistons 7 are disposed in the cylinder bores 6 of the cylinder block 3. Each of the pistons 7 is made of, for example, an aluminum alloy. Each of the pistons 7 reciprocates vertically within a corresponding one of the cylinder bores 6.

The piston 7 is joined to the crankshaft 5 through the connecting rod 8. The reciprocating motion of the piston 7 is converted by the connecting rod 8 into rotational motion of the crankshaft 5. The engine 1 in this embodiment is implemented by a transverse engine with the crankshaft 5 extending in a width-wise direction (i.e., a lateral direction) of the vehicle.

The cylinder bores 6 are provided one for each cylinder of the engine 1. In a case of four cylinders, the four cylinder bores 6 are formed in the engine 1. This embodiment refers to the four-cylinder engine 1, but however, the number of the cylinders are limited to four. The engine 1 may be implemented by a gasoline engine or a diesel engine, but is not limited to the gasoline and diesel engines.

In FIG. 2, the piston 7 includes the piston crown 9 (see FIGS. 3 and 4) which is reciprocable relative to the inner wall 6a of the cylinder bore 6 and a pair of skirts 10 and 11 which extend downward from the piston crown 9. The piston crown 9 in this embodiment constitutes a piston body in the invention.

The piston 7 also includes a pair of side walls 12 and 13 and a pair of piston pin bosses 14 and 15. The side walls 12 and 13 connect with the left sides 10a and 11a and the right sides 10b and 11b of the respective skirts 10 and 11. The piston pin bosses 14 and 15 are formed on the side walls 12 and 13 and retain the piston pin 16 (see FIG. 1) to be rotatable.

The piston pin 16 is made of a cylindrical pin which has the center axis C1 (see FIG. 3) extending perpendicular to the center axis C of the piston crown 9. The left sides 10a and 11a and the right sides 10b and 11b each have a given width from the right and left ends of the skirts 10 and 11 in the circumferential direction of the piston 7, respectively.

The piston pin bosses 14 and 15 have the piston pin fitting holes 14A and 15A, respectively, in which the piston pin 16 is fit. The piston pin 16 is disposed inside the piston pin fitting holes 14A and 15A and retained by the piston pin bosses 14 and 15.

In FIG. 1, the connecting rod 8 has the small-diameter portion 8A joined to the piston pin 16. The connecting rod 8 also has the large-diameter portion 8B joined to the crankshaft 5. With these arrangements, reciprocating motion of the piston 7 is converted using the connecting rod 8 into rotational motion of the crankshaft 5.

The cylinder head 4 has formed therein the intake port 21 from which air is sucked and delivered into the combustion chamber 18 formed in the cylinder bore 6 above the piston 7.

The cylinder head 4 also has formed therein the exhaust port 22 from which exhaust emissions or gas, as generated by burning of air-fuel mixture within the combustion chamber 18, is discharged.

The cylinder head 4 has the intake camshaft 23, the exhaust camshaft 24, the intake valve 25, and the exhaust valve 26 mounted therein. The intake camshaft 23 is equipped with the intake cam 23A. The exhaust camshaft 24 is equipped with the exhaust cam 24A. The intake valve 25 is driven by the intake cam 23A to selectively establish or block communication between the intake port 21 and the combustion chamber 18. The exhaust valve 26 is driven by the exhaust cam 24A to selectively establish or block communication between the exhaust port 22 and the combustion chamber 18.

Figure 3:
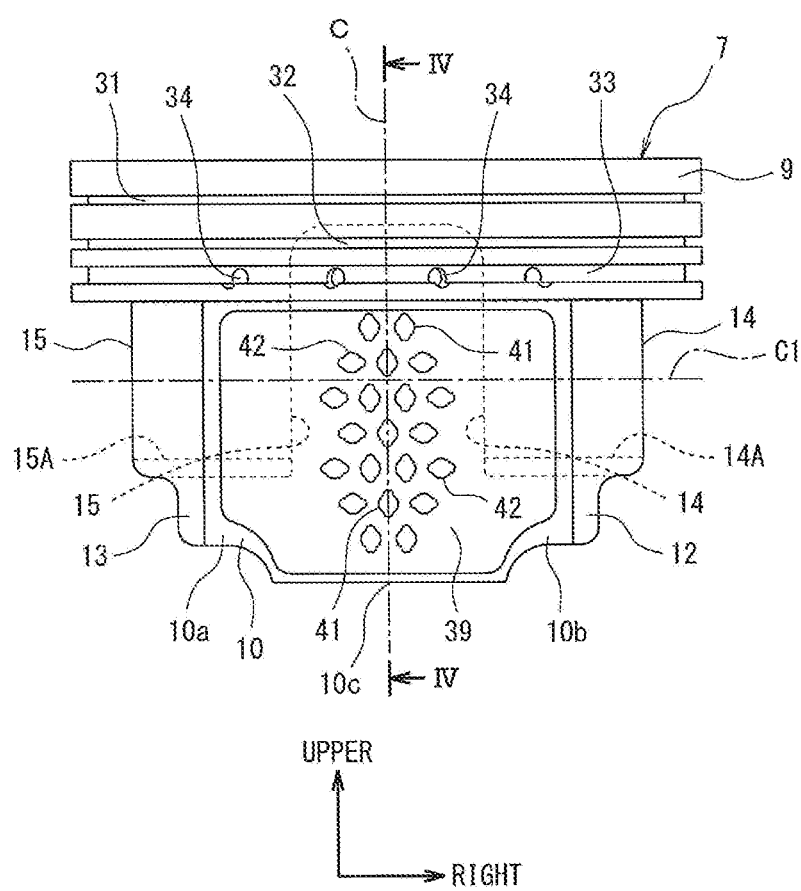
FIG. 3 is a view which illustrates an embodiment of a piston for the internal combustion engine in the invention and an illustration, as viewed from a surface of the piston contacting an inner wall of a cylinder bore.

In FIGS. 2 and 3, the piston crown 9 has formed in an outer periphery thereof the first compression ring groove 31, the second compression ring groove 32, and the oil ring groove 33 which are arranged in this order from an upper portion of the piston crown 9.

The first compression ring groove 31 and the second compression ring groove 32 have a first compression ring and a second compression ring, not shown, fit therein, respectively. The oil ring groove 33 has an oil ring, not shown, serving as a piston ring fit therein.

The first compression ring groove 31 and the second compression ring groove 32 each have a feature which hermetically seal the combustion chamber 18 in contact with the inner wall 6a of the cylinder bore 6.

The oil ring contacts the inner wall 6a of the cylinder bore 6 following the reciprocating motion of the piston 7, thereby scraping oil adhered to the inner wall 6a of the cylinder bore 6.

The oil ring groove 33 has formed in a bottom thereof a plurality of oil return holes 34 located close to a thrust side and an anti-thrust side. The oil return holes 34 have openings oriented from the bottom of the oil ring groove 33 toward an inner peripheral surface of the piston crown 9.

The thrust side, as referred to herein, is a portion of the surface of the piston 7 where a thrust, as generated by a rotational force of the crankshaft 5 during a downward stroke of the piston 7 in the cylinder bore 6 and oriented perpendicular to the longitudinal center line of the crankshaft 5, acts on the inner wall 6a of the cylinder bore 6.

The anti-thrust side is a portion of the surface of the piston 7 where a thrust which is generated during an upward stroke of the piston 7 in the cylinder bore 6 and oriented in a direction opposite that of the above thrust acts on the inner wall 6a of the cylinder bore 6.

Oil is delivered from the oil jet hole 8a (see FIG. 1) formed in the large-diameter portion 8B of the connecting rod 8 to between the piston 7 and the cylinder bore 6, thereby forming, as clearly illustrated in FIG. 2, an oil film made by the oil 35 between the piston 7 and the inner wall 6a of the cylinder bore 6.

The oil 35, therefore, serves to cool the piston 7 and also lubricate between the outer periphery of the piston 7 and the inner wall 6a of the cylinder bore 6. An oil induction member is not limited to the oil jet hole 8a.

The crankcase 2 has an oil pan, not shown, disposed in a lower portion thereof. The cylinder bore 6 communicates with the oil pan. When oil adhered to the inner wall 6a of the cylinder bore 6 is scraped off by the oil ring fit in the oil ring groove 33 following vertical movement of the piston 7 in the cylinder bore 6, it is discharged from the oil ring groove 33 to the inner peripheral surface of the piston crown 9 through the oil return hole 34 and then returned back to the oil pan through a gap between the skirts 10 and 11.

The skirts 10 and 11 contact the thrust side or the anti-thrust side during the reciprocating motion of the piston 7, thereby controlling oscillation of the piston 7.

The skirt 10 is, as illustrated in FIG. 3, shaped to have a long side extending parallel to the center axis C of the piston crown 9 and a short side extending perpendicular to the center axis C of the piston crown 9. The skirt 11, like the skirt 10, has long and short sides.

Figure 6:
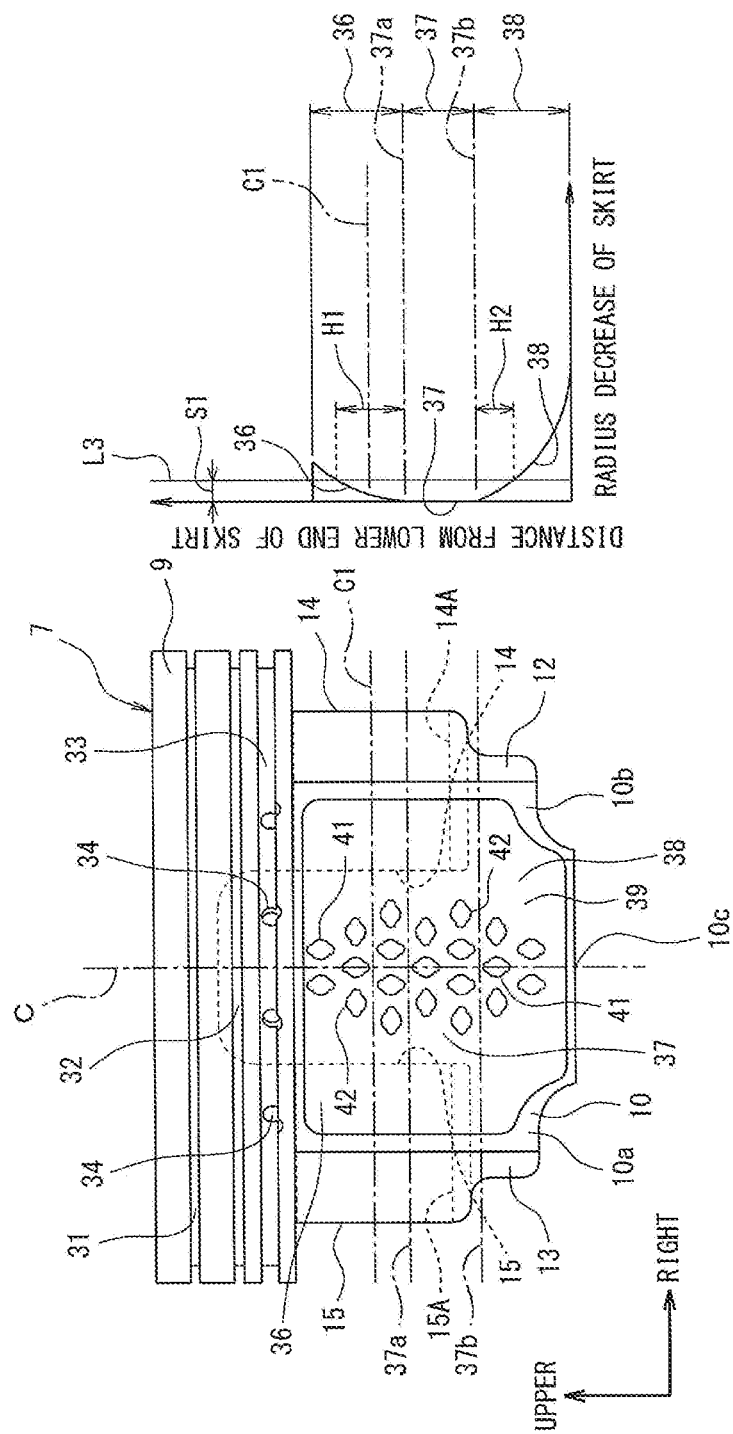
FIG. 6 is a view which illustrates an embodiment of a piston for the internal combustion engine in the invention and also shows a positional relation between the piston and a curved surface of a skirt of the piston.

In FIGS. 5 and 6, each of the skirts 10 and 11 includes a central portion in a direction in which the center axis C of the piston crown 9 extends. The central portion of each of the skirts 10 and 11 has the largest diameter and defines the central skirt portion 37. The central skirt portions 37 are defined by flat surface areas of the skirts 10 and 11 extending parallel to the center axis C of the piston crown 9. The center axis C of the piston crown 9 is aligned coaxially with the center axis of the skirts 10 and 11.

Each of the skirts 10 and 11 also includes the upper skirt portion 36 located above the upper boundary 37a of the central skirt portion 37. The upper skirt portion 36 is curved to have an outer diameter which gradually decreases from the upper boundary 37a toward the center axis C of the piston crown 9 above the upper boundary 37a.

The upper boundary 37a is defined in each of the skirts 10 and 11 and located below the center axis C1 of the piston pin 16 in the direction of the center axis C of the piston crown 9. In other words, the piston pin 16 is arranged to have the center axis C1 located in a range where the upper skirt portions 36 lie in the direction of the center axis C of the piston crown 9.

Each of the skirts 10 and 11 also includes the lower skirt portion 38 located below the lower boundary 37b of the central skirt portion 37. The lower skirt portion 38 is curved to have an outer diameter which gradually decreases from the lower boundary 37b toward the center axis C of the piston crown 9 below the lower boundary 37b. In other words, each of the skirts 10 and 11 is formed in a barrel shape.

A decrease in radius (which will also be referred to below as a radius decrease) of each of the lower skirt portions 38 from the lower boundary 37b toward the center axis C of the piston crown 9 is set larger than that of each of the upper skirt portions 36 from the upper boundary 37a toward the center axis C of the piston crown 9.

FIGS. 5 and 6 illustrate the skirts 10 and 11 as being largely curved for the sake of convenience, but they are actually curved to have a curvature smaller than the illustrated one.

Figure 4:
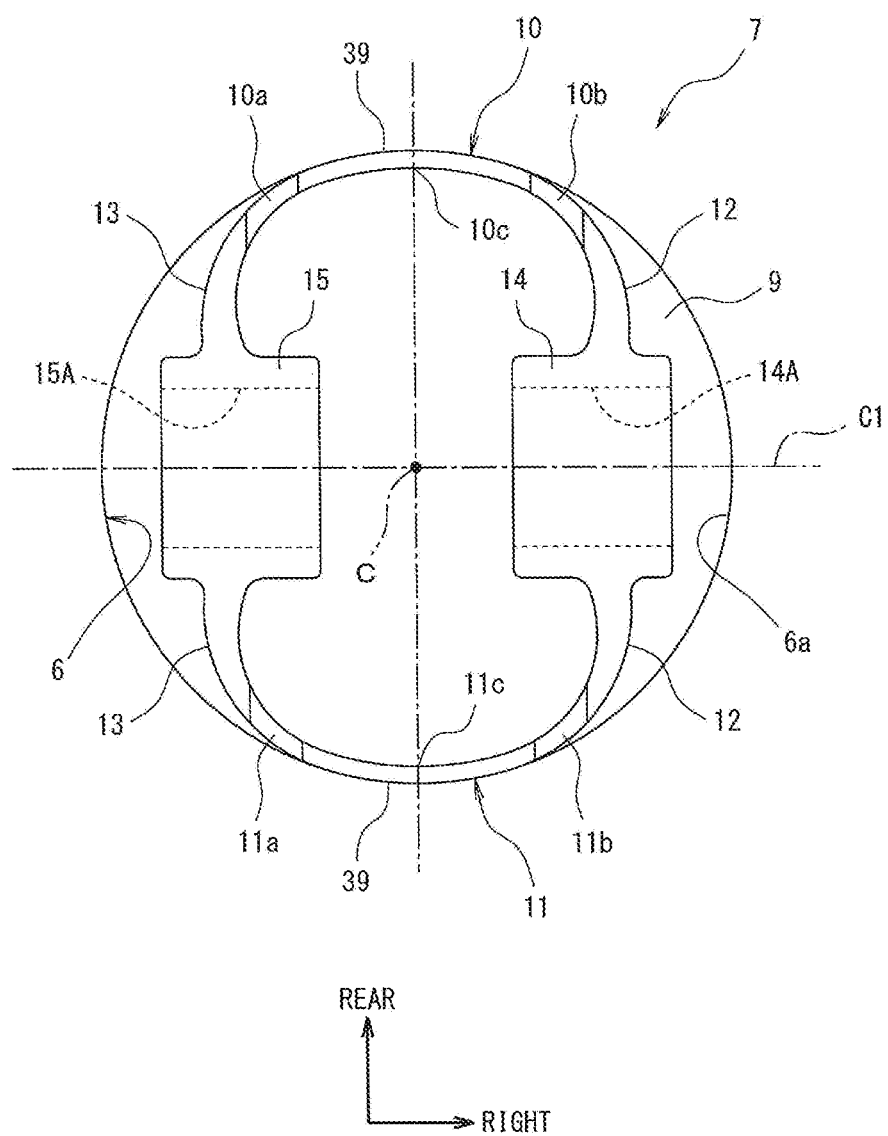
FIG. 4 is a view which illustrates an embodiment of a piston for the internal combustion engine in the invention and an illustration of the piston, as viewed from below a vehicle.

In FIG. 4, each of the skirts 10 and 11 are shaped to have a curvature which increases from a corresponding one of circumferential center portions 10c and 11c toward joints with the side walls 12 and 13, that is, toward the left sides 10a and 11a or the right sides 10b and 11b in a circumferential direction of the piston 7.

Each of the circumferential center portions 10c and 11c is defined as an apex of an outline of a corresponding one of the skirts 10 and 11 between the side walls 12 and 13 in the circumferential direction of the piston 7. A clearance between each of the skirts 10 and 11 and the inner wall 6a of the cylinder bore 6 in the radial direction of the piston 7 is the smallest between each of the circumferential center portions 10c and 11c and the inner wall 6a of the cylinder bore 6.

Figure 9:
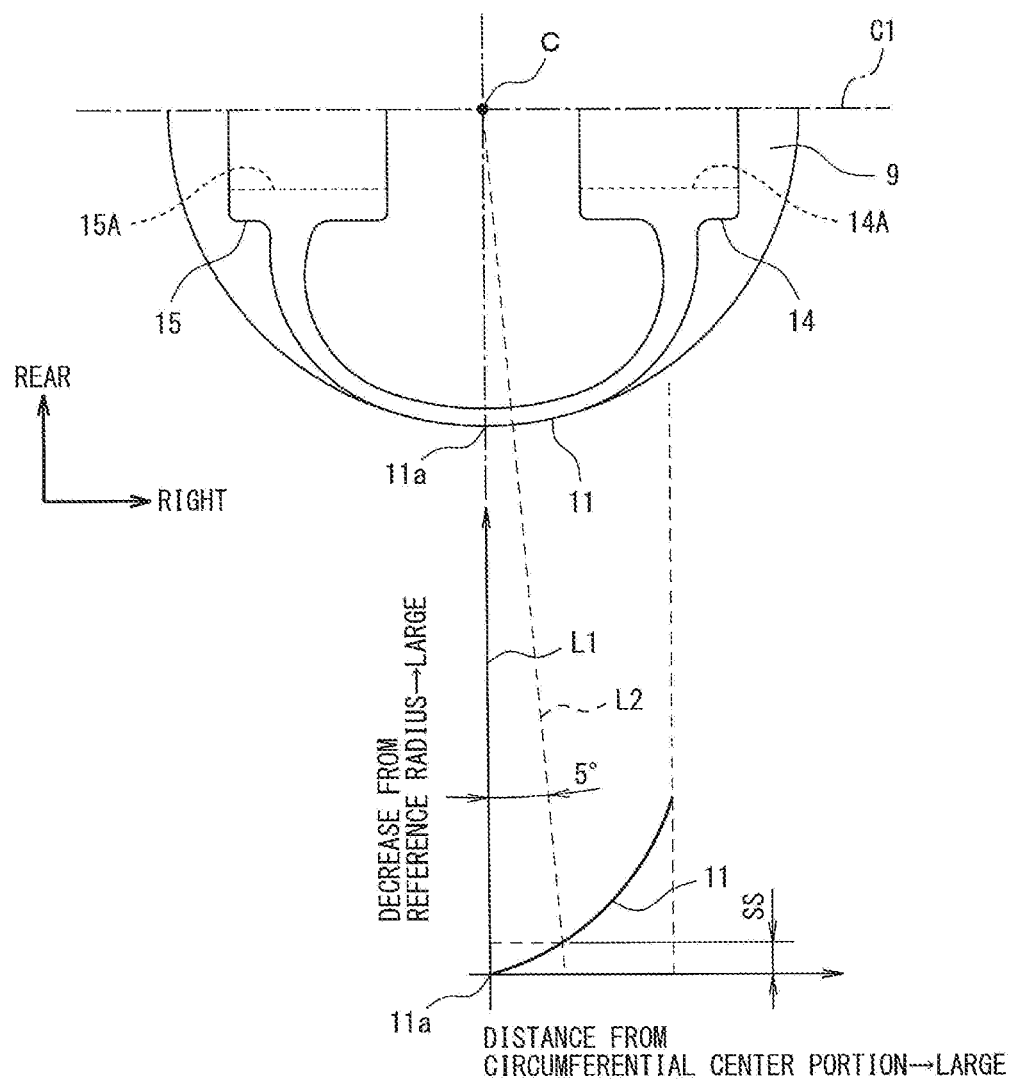
FIG. 9 is a view which represents a change in curvature of a central skirt portion in a circumferential direction of a piston for an internal combustion engine according to an embodiment of the invention.

The imaginary plane L1 is, as illustrated in FIG. 9, defined which passes through the circumferential center portion 11c of the central skirt portion 37 and the center axis C of the piston crown 9. The imaginary plane L2 is defined which extends from the center axis C of the piston crown 9 and is inclined at 5° to the imaginary plane L1.

An amount by which the radius of the central skirt portion 37 (i.e., a distance between the center axis C of the piston crown 9 and the circumferential center portion 11c of the skirt 11) is decreased from the circumferential center portion 11c to a portion of the central skirt portion 37 through which the imaginary plane L2 passes (which will also be referred to below as a radius decrease SS) is preferably selected to be 0.005 mm or less and 0.002 mm or more. In other words, a difference in radius between portions of the central skirt portion 37 lying on the imaginary planes L1 and L2.

In FIGS. 2 and 4, each of the skirts 10 and 11 has disposed on an outer surface thereof the resin-coated layer 39 which is made using, for example, screen printing techniques in order to reduce a friction loss or enhance a high thermal resistance thereof. The resin-coated layer 39 has a constant thickness. The resin-coated layer 39 occupies surfaces of the central skirt portion 37, the upper skirt portion 36, and the lower skirt portion 38 which face the inner wall 6a of the cylinder bore 6.

Figure 7:
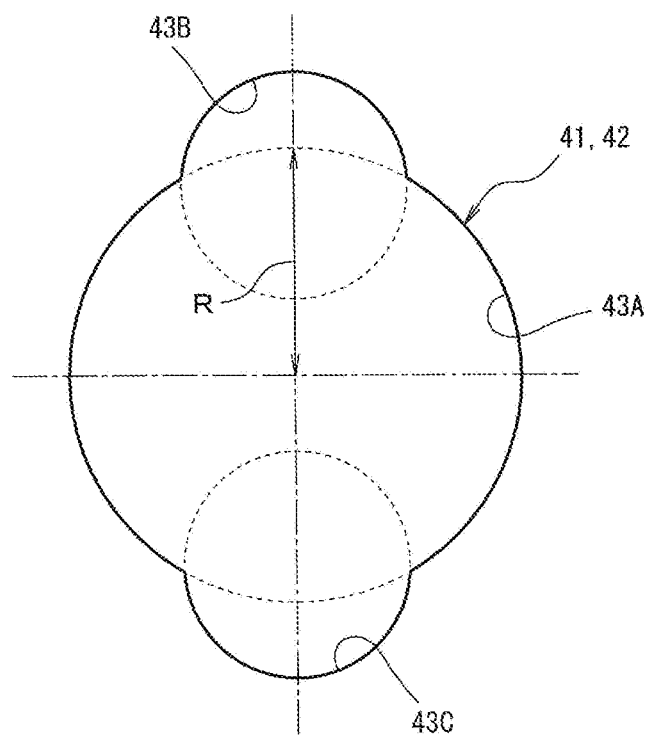
FIG. 7 is a view which illustrates an embodiment of a piston for the internal combustion engine in the invention and a structural view of a recess.

In FIG. 3, the resin-coated layer 39 has a plurality of recesses 41 and 42 formed therein. Each of the recesses 41 and 42 is shaped to have a depth which is equal to a thickness of the resin-coated layer 39 and selected to be, for example, 5 μm or more and 20 μm or less. Each of the recesses 41 and 42, as illustrated in FIG. 7, is made up of the large-diameter circular portion 43A with arc-shaped outer edges and the small-diameter circular portions 43B and 43C with arc-shaped outer edges. In other words, each of the recesses 41 and 42 is configured to have an outline defined by a combination of the large-diameter circular portion 43A and the small-diameter circular portions 43B and 43C.

The large-diameter circular portion 43A is shaped to have a radius R. The small-diameter circular portions 43B and 43C are shaped to have a radius smaller than the radius R and smaller in area than the large-diameter circular portion 43A. The small-diameter circular portions 43B and 43C partially overlap the large-diameter circular portion 43A. The small-diameter circular portions 43B and 43C are diametrically opposed to each other through the large-diameter circular portion 43A in the center axial direction C of the piston crown 9 or in a direction perpendicular to the center axial direction C. The small-diameter circular portions 43B and 43C communicate with the large-diameter circular portion 43A.

Figure 8:
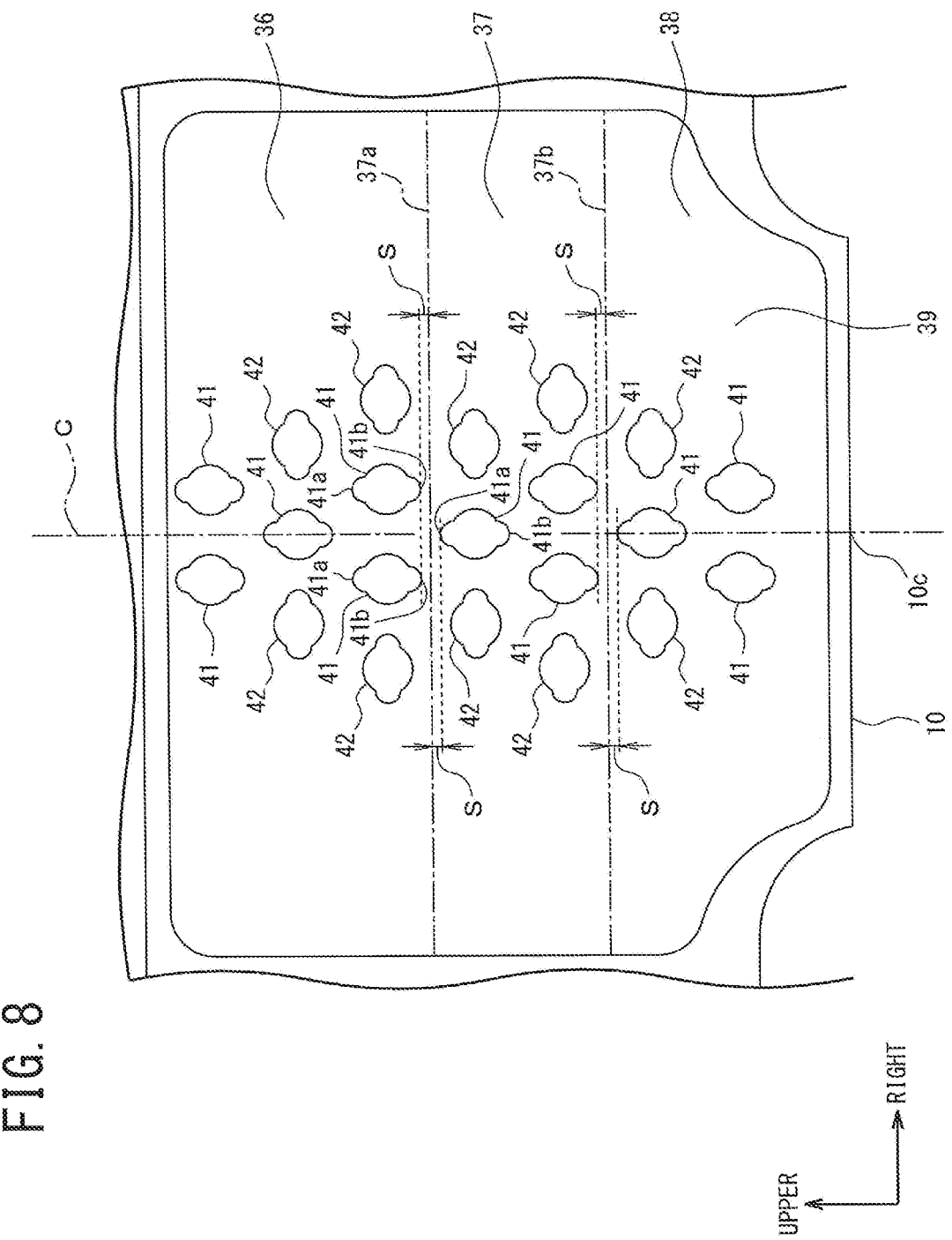
FIG. 8 is a view which illustrates a positional relation among an upper boundary, a lower boundary, and recesses of a piston for an internal combustion engine according to an embodiment of the invention.

In FIG. 8, the recesses 42 are arranged above or below the upper boundary 37a or the lower boundary 37b in the center axial direction C of the piston crown 9 (i.e., the vertical direction) and aligned with the recess(s) 41 in a direction perpendicular to the center axial direction C of the piston crown 9. In other words, the recesses 42 which are aligned with each other in the direction perpendicular to the center axial direction C of the piston crown 9 are located at the same height as the recesses 42 in the center axial direction C. Each of the recesses 42 aligned with the recess(s) 41 in the direction perpendicular to the center axial direction C is arranged below the upper end 41a and above the lower end 41b of the recess 41 which is aligned with that recess 42 in the direction perpendicular to the center axial direction C. Therefore, each of the recesses 41 is located closer to the upper boundary 37a or the lower boundary 37b than the recesses 42 are in the center axial direction C of the piston crown 9.

The recesses 41 which are arranged close to the upper boundary 37a or the lower boundary 37b are located away from the upper boundary 37a or the lower boundary 37b.

Specifically, of the recesses 41 arranged in the upper skirt portion 36, ones located close to the upper boundary 37a have the lower ends 41b located above at a distance S away from the upper boundary 37a.

Of the recesses 41 arranged in the central skirt portion 37, one located close to the upper boundary 37a has the upper end 41a located below at the distance S away from the upper boundary 37a. Of the recesses 41 arranged in the lower skirt portion 38, one located close to the lower boundary 37b has the upper end 41a located below at the distance S away from the lower boundary 37b.

Of the recesses 41 arranged in the central skirt portion 37, ones located close to the lower boundary 37b have the lower ends 41b located above at the distance S away from the lower boundary 37b. The distance S is preferably selected to be 0.05 mm or more and 0.5 mm or less.

The recesses 41 are, as clearly illustrated in FIG. 3, arranged in the circumferential center portion 10c of the skirt 10 and substantially aligned in the center axial direction C of the piston crown 9.

Each of the recesses 41 is oriented to have a longitudinal center line extending parallel to the center axial direction C of the piston crown 9. The longitudinal center line of each of the recesses 41, as referred to herein, is defined as a line with which the large-diameter circular portion 43A and the small-diameter circular portions 43B and 43C are aligned. In other words, each of the recesses 41 is shaped to have a length extending parallel to the center axial direction C of the piston crown 9 and a width extending in the circumferential direction of the skirts 10 and 11. The length of each of the recesses 41 is longer than the width thereof. The recesses 41 in this embodiment constitute vertically long recesses in the invention.

Each of the recesses 42 is oriented to have a longitudinal center line extending perpendicular to the center axial direction C of the piston crown 9. The longitudinal center line of each of the recesses 42, as referred to herein, is defined as a line with which the large-diameter circular portion 43A and the small-diameter circular portions 43B and 43C are aligned. In other words, each of the recesses 42 is shaped to have a length extending in the circumferential direction of the skirts 10 and 11 (i.e., in a horizontal direction) and a width extending parallel to the center axial direction C of the piston crown 9 (i.e., a vertical direction). The length of each of the recesses 42 is longer than the width thereof. The recesses 42 in this embodiment constitute horizontally long recesses in the invention.

The recesses 41 are formed in the circumferential center portion 10c of the skirt 10. The recesses 42 are located closer to the side wall 12 or 13 than the circumferential center portion 10c of the skirt 10 is.

FIG. 7 merely illustrate the configuration of the recesses 41 and 42 regardless of orientation thereof. The recesses 41 and 42 are formed in the resin-coated layer 39 as the vertically long recesses 41 and the horizontally long recesses 42.

The skirt 11, like the skirt 10, has the recesses 41 and 42 formed therein. The following discussion will refer only to the recesses 41 and 42 of the shirt 10 for the brevity of explanation. The recesses 41 and 42 formed in the skirt 10 are symmetrical with the recesses 41 and 42 formed in the skirt 11 with respect to the center axis C of the piston crown 9.

The density of the skirt 10 which is defined by the number of the recesses 41 and 42 per unit area is the highest in the circumferential center portion 10c of the skirt 10. The density of the recesses 41 and 42 is gradually decreased from the circumferential center of the skirt 10 toward the side wall 12 or 13.

The resin-coated layer 39 is made by applying lubricating resin material mainly contacting, for example, graphite, polyamide-imide (PAI), and polytetrafluoroethylene to each of the skirts 10 and 11 using a screen printing machine.

Specifically, each of the skirts 10 and 11 is covered with masks each of which is identical in shape with a combination of the large-diameter circular portion 43A and the small-diameter circular portions 43B and 43C. The lubricating resin material is then applied to the skirts 10 and 11 to make the recesses 41 and 42 on the surfaces of the skirts 10 and 11.

Specifically, each of the recesses 41 and 42 serves as an oil sump and is shaped to have an outer edge made of the resin-coated layer and a bottom uncoated with the resin-coated layer (which will also be referred to as an uncoated area or portion). The resin-coated layer 39 may be made in another way. The material of the resin-coated layer 39 is not limited to the above material.

The upper skirt portion 36 and the lower skirt portion 38 are, as can be seen in FIG. 6, shaped to have the first distance H1 and the second distance H2. The first distance H1 is a distance from the upper boundary 37a to a portion of the upper skirt portion 36 where the given radius decrease SS is created on the imaginary plane L3. The imaginary plane L3 is defined to extend parallel to the center axial direction C of the piston crown 9 and pass through the skirt 10. The first distance H1 is selected to be longer than the second distance H2 that is a distance from the lower boundary 37b to a portion of the lower skirt portion 38 where the radius decrease SS is created on the imaginary plane L3.

The operation will be described below.

The reason why pressure acting on a contact between a circumferential area of each of the skirts 10 and 11 and the inner wall 6a of the cylinder bore 6 becomes high will be discussed below.

When the skirt 10 or 11 contacts the inner wall 6a of the cylinder bore 6 during reciprocating motion of the piston 7 in the cylinder bore 6, a portion of pressure, as produced by combustion of fuel, is exerted by the connecting rod 8 and the piston pin 16 on the piston 7 and then inputted to a contact of each of the piston pin bosses 14 and 15 with the piston pin 16 (which will also be referred to as a pressure input point) to press the skirts 10 and 11 against the inner wall 6a of the cylinder bore 6 の the inner wall 6a.

The friction, as exerted between each of the skirts 10 and 11 and the inner wall 6a of the cylinder bore 6 during the reciprocating motion of the piston 7, is created by the pressure produced by the combustion of fuel and resists vertical motion of the skirts 10 and 11.

The piston 7 is allowed to slant or swing relative to the cylinder bore 6 about the center axis C1 of the piston pin 16 to a degree corresponding to a difference between an inner diameter of the cylinder bore 6 and an outer diameter of the piston 7, that is, within a clearance between the inner wall 6a of the cylinder bore 6 and the piston 7.

In the piston 7, when the radius decrease of the upper skirt portion 36 is selected to be greater than that of the lower skirt portion 38, it will cause the degree of inclination of the piston 7 to be increased with an increase in clearance between the upper skirt portion 36 and the inner wall 6a of the cylinder bore 6, so that the lower skirt portion 38 frictionally contacts with the cylinder bore 6 at a high pressure.

Especially, in the expansion stroke of the piston 7, a high combustion pressure is exerted on the piston 7, thus resulting in an increase in moment to incline the piston 7. The moment is proportional to a distance from the center axis C1 of the piston pin 16, so that a moment acting on the lower end of the lower skirt portion 38 is maximized on the skirt 10 or the skirt 11. This results in an increase in friction of the piston 7 relative to the cylinder bore 6, which will lead to an increase in fuel consumption of the engine 1.

The piston 7 in this embodiment is, as described above, equipped with the skirts 10 and 11 each of which has the maximum outer diameter on the central portion in the center axial direction C of the piston crown 9. The piston 7 also includes the central skirt portions 37 each of which has a surface extending parallel to the center axis C of the piston crown 9.

Each of the skirts 10 and 11, as described above, includes the upper skirt portion 36 and the lower skirt portion 38. The upper skirt portion 36 is located above the upper boundary 37a of the center skirt portion 37 and curved so as to have an outer diameter gradually decreasing from the upper boundary 37a toward the center axis C of the piston crown 9. The lower skirt portion 38 is located below the lower boundary 37b of the center skirt portion 37 and curved so as to have an outer diameter gradually decreasing from the lower boundary 37b toward the center axis C of the piston crown 9.

The above configuration creates a clearance between the central skirt portion 37 and the inner wall 6a of the cylinder bore 6 which is kept constant in the center axial direction C of the piston crown 9, thereby ensuring the stability of attitude of the piston 7 at the central skirt portion 37.

In the piston 7, the radius decrease of the lower skirt portion 38 that is an amount by which the radius of the lower skirt portion 38 decreases from the lower boundary 37b toward the center axis C of the piston crown 9 is selected to be greater than that of the upper skirt portion 36 that is an amount by which the radius of the upper skirt portion 36 decreases from the upper boundary 37a toward the center axis C of the piston crown 9.

Figure 14:
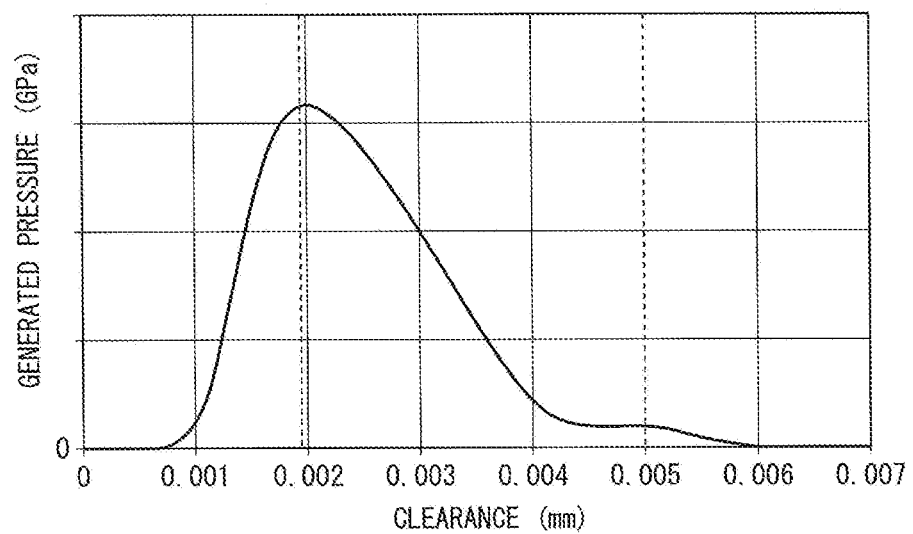
FIG. 14 is a view which represents a relation between a clearance between a skirt and an inner wall of a cylinder bore and a dynamic pressure in a piston for an internal combustion engine according to an embodiment of the invention.

The radius decrease of the upper skirt portion 36 causes the piston 7 to be forcibly inclined to an angle which meets clearance conditions, as demonstrated in FIG. 14. Additionally, physical interference between the lower end of the lower skirt portion 38 and the inner wall 6a of the cylinder bore 6 which usually arises from the inclination of the piston 7 is also minimized, thereby decreasing the friction loss of the lower skirt portion 38 relative to the cylinder bore 6. This improves the fuel economy of the engine 1.

The physical interference between the lower end of the lower skirt portion 38 and the inner wall 6a of the cylinder bore 6 is also avoided, thereby eliminating a risk of mechanical noise resulting from such interference which usually causes vehicle occupants to feel discomfort.

Figure 10:
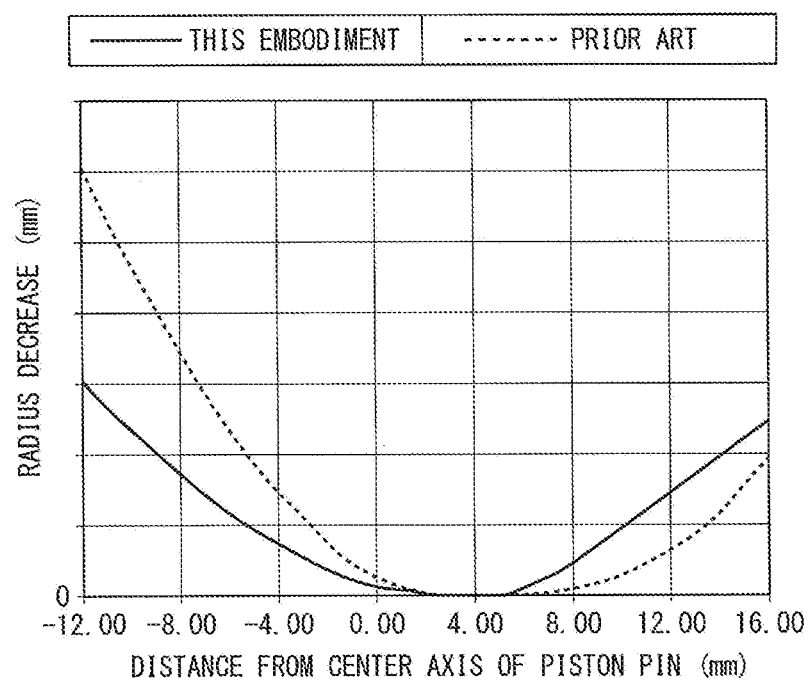
FIG. 10 is a view which illustrates a profile of a skirt of a piston for an internal combustion engine according to an embodiment of the invention.

FIG. 10 demonstrates a skirt profile of the piston 7. The plus side represents a lower end of the lower skirt portion 38. The minus side represents an upper end of the lower skirt portion 38, that is, the lower boundary 37b. A broken line indicates a conventional piston. A solid line indicates the piston 7 in this embodiment. The lower skirt portion 38 in this embodiment is designed to have the radius decrease larger than that of a lower skirt portion of the conventional piston. The upper skirt portion 36 in this embodiment is designed to have the radius decrease smaller than that of an upper skirt portion of the conventional piston.

Figure 11:
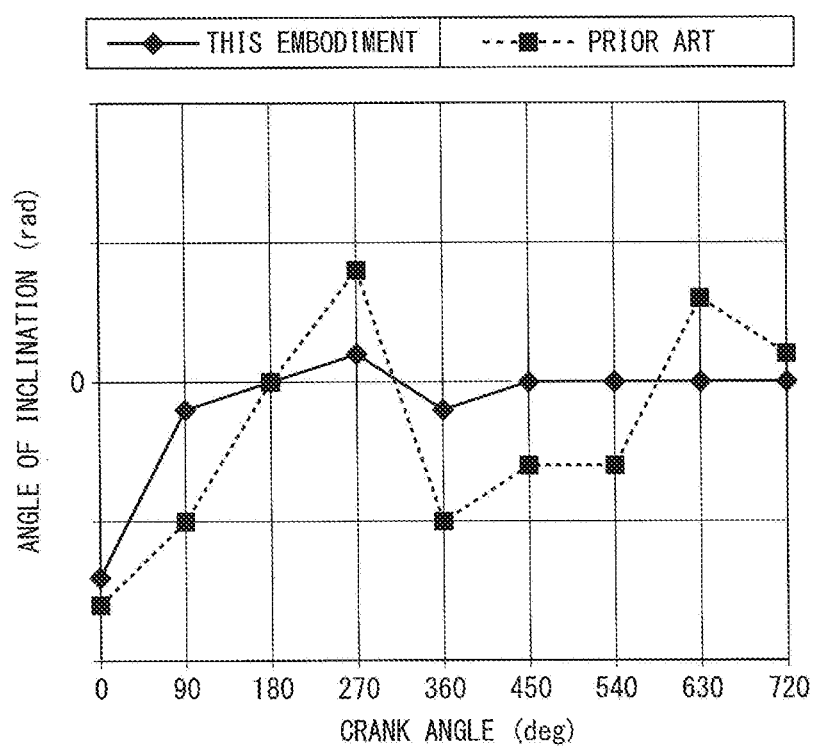
FIG. 11 is a view which represents a relation among an inclination angle of a piston for an internal combustion engine according to an embodiment of the invention and a crank angle and a relation between an inclination angle of a prior art piston and the crank angle.

FIG. 11 demonstrates angles of inclination of the piston 7 in this embodiment and the conventional piston mounted in an engine when the engine is operating.

The graph of FIG. 11 shows that the angle of inclination of the piston 7 in this embodiment is lower than that of the conventional piston throughout a range of one cycle of the four-stroke engine (i.e., two revolutions the crankshaft, that is, 720°), that is, that the piston 7 moves vertically straight for a longer period of time than the conventional piston.

In other words, the structure of the piston 7 in this embodiment minimizes a physical contact of the lower end of the lower skirt portion 38 with the inner wall 6a of the cylinder bore 6, thereby reducing the friction loss as compared with the conventional piston.

The piston 7 is designed to have the piston pin 16 whose center axis C1 lies in a range between upper and lower ends of the upper skirt portion 36 in the center axial direction C of the piston crown 9, thereby causing the piston 7 to be forcibly inclined around the center axis C1 of the piston pin 16 to an angle which meets the clearance conditions in FIG. 14.

Next, the lubrication of the piston 7 and the inner wall 6a of the cylinder bore 6 will be described below.

Figure 12:
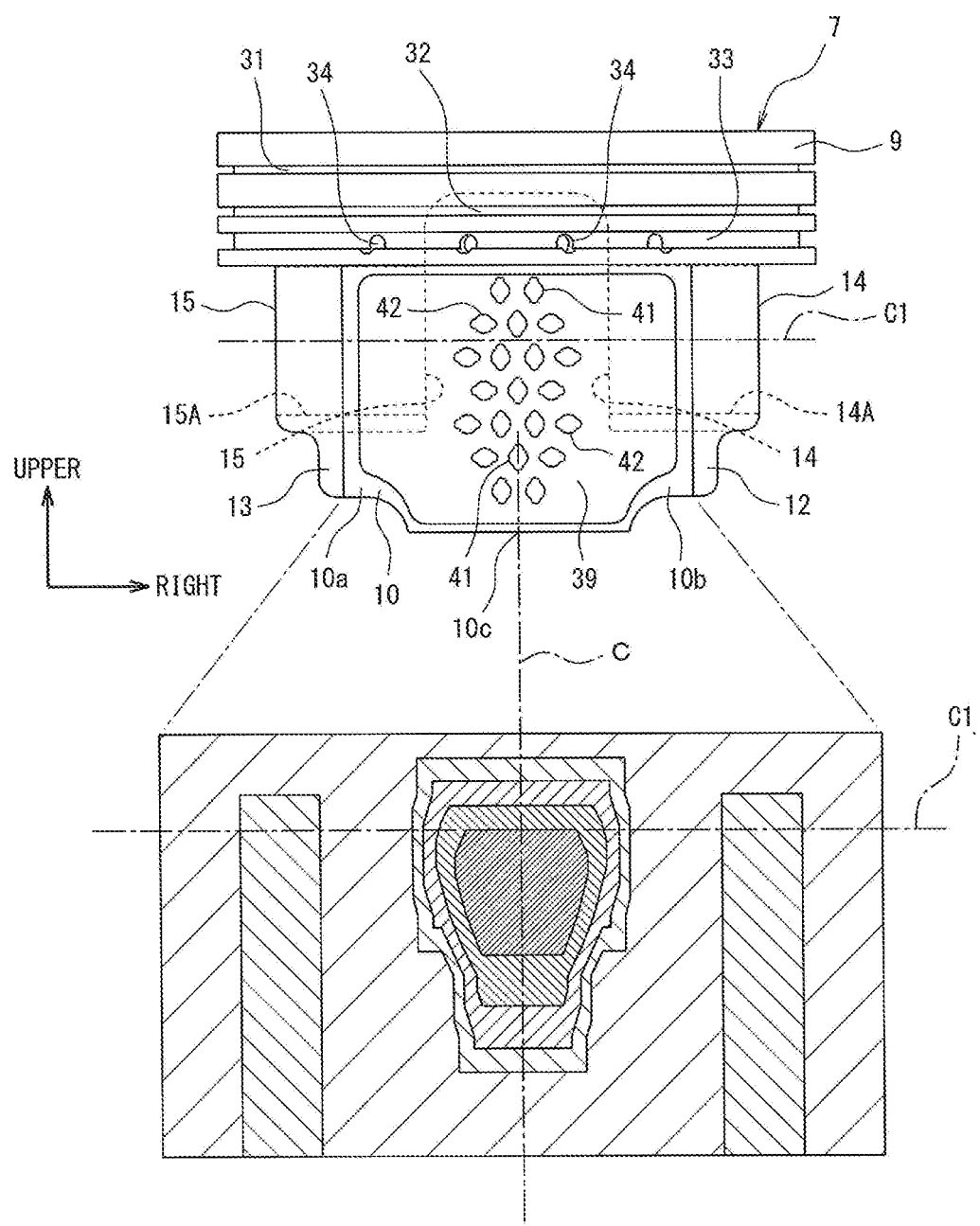
FIG. 12 is a view which illustrates a piston for an internal combustion engine according to an embodiment of the invention and a positional relation between the piston and a surface pressure acting on a skirt of the piston.

FIG. 12 illustrates a distribution of surface pressure between each of the skirts 10 and 11 and the inner wall 6a of the cylinder bore 6. FIG. 12 shows that regions where a spacing between diagonal lines is small (i.e., the density of the diagonal lines is high) is proportional to the degree of the surface pressure, and that the region where the spacing between the diagonal lines is smaller is subjected to a greater degree of surface pressure.

The skirts 10 and 11 are formed in the shape of a barrel to have the circumferential center portions 10c and 11c bulging outward in a direction perpendicular to the center axis C1 of the piston pin 16 and also have a curvature increasing from the circumferential center portions 10c and 11c toward the side walls 12 and 13 in the circumferential direction.

The above shape of the skirts 10 and 11 results in a minimum clearance between the central skirt portion 37 and the inner wall 6a of the cylinder bore 6, so that the pressure on contacts of the skirts 10 and 11 with the inner wall 6a of the cylinder bore 6 is decreased from the central skirt portion 37 outward in the center axial direction C of the piston crown 9 and from the circumferential center portions 10c and 11c outward in the circumferential direction.

Therefore, conditions to lubricate portions of the skirts 10 and 11 which have a small clearance between themselves and the inner wall 6a of the cylinder bore 6 and are also subjected to a high degree of pressure acting on contacts thereof with the inner wall 6a of the cylinder bore 6 is severer than that to lubricate portions of the skirts 10 and 11 which have a large clearance between themselves and the inner wall 6a of the cylinder bore 6 and are also subjected to a low degree of pressure acting on contacts thereof with the inner wall 6a of the cylinder bore 6.

The piston 7 in this embodiment is designed to facilitate a required degree of lubrication in the above severe conditions. How to lubricate the piston 7 will be described below in detail.

The skirts 10 and 11 are identical in operation with each other. The following discussion will, therefore, refer only to the skirt 10 for the brevity of disclosure. In the following discussion, upstream and downstream sides of the piston 7 express forward and rearward directions, respectively, in which the piston 7 moves.

The piston 7 in this embodiment is designed to have the vertically long recesses 41 and the horizontally long recesses 42 formed in a portion of the skirt 10 which has a small clearance between itself and the inner wall 6a of the cylinder bore 6 and is subjected to a high degree of pressure acting on a contact thereof with the inner wall 6a of the cylinder bore 6.

Each of the recesses 41 and 42 is, as described above, defined by the large-diameter circular portion 43A and the small-diameter circular portions 43B and 43C. The small-diameter circular portions 43B and 43C are each defined by a circle whose area is smaller than that of the large-diameter circular portion 43A. The small-diameter circular portions 43B and 43C are diametrically opposed to each other through the large-diameter circular portion 43A in the center axial direction C of the piston crown 9.

The recesses 41 and 42 work to generate dynamic pressure of oil when the piston 7 is vertically moving.

When the piston 7 moves upward, oil is delivered from the upstream side (i.e., the combustion chamber 18) into a gap between the upper skirt portion 36 and the inner wall 6a of the cylinder bore 6. The oil then flows into a downstream one of the small-diameter circular portions 43B from the large-diameter circular portion 43A of each of the recesses 41. When the oil enters the downstream small-diameter circular portion 43B, a flow of the oil is choked, thereby creating a high dynamic pressure.

Additionally, the oil is also inputted from the large-diameter circular portion 43A of one of the recesses 42 into the large-diameter circular portion 43A and the small-diameter circular portions 43B and 43C of a downstream one of the recesses 42. After the volume of the oil in the downstream recess 42 is increased, the oil then flows from the large-diameter circular portion 43A and the small-diameter circular portions 43B and 43C into the large-diameter circular portion 43A of a further downstream one of the recesses 42, thereby causing the flow of the oil to be chocked to generate a high dynamic pressure.

Particularly, the magnitude of dynamic pressure occurring on a frictional interface (i.e., a contact surface between two objects) depends upon a radius of curvature of an outline of the object. The higher the dynamic pressure, the more the thickness of an oil film.

An amount by which the flow of oil from an upstream to a downstream one of the recesses 42 is smaller, so that the magnitude of the dynamic pressure generated in the recesses 42 is lower than that in the recesses 41.

Therefore, when the piston 7 moves upward, the pressure acts on the skirt 10 to urge it away from the inner wall 6a of the cylinder bore 6, thereby resulting in an increased thickness of an oil layer between the central skirt portion 37 and the inner wall 6a of the cylinder bore 6 which have a small clearance therebetween and a large contact surface therebetween.

When the piston 7 moves downward, oil is delivered from the upstream side (i.e., the crankshaft 5) into a gap between the lower skirt portion 38 and the inner wall 6a of the cylinder bore 6. The oil is then inputted from an upstream one of the small-diameter circular portions 43C to the large-diameter circular portion 43A of each of the recesses 41, so that it is accumulated in the large-diameter circular portion 43A. The oil then flows into a downstream one of the small-diameter circular portions 43B from the large-diameter circular portion 43A. When the oil enters the downstream small-diameter circular portion 43B, a flow of the oil is choked, thereby creating a high dynamic pressure.

Additionally, the oil is also inputted from the large-diameter circular portion 43A of one of the recesses 42 into the large-diameter circular portion 43A and the small-diameter circular portions 43B and 43C of a downstream one of the recesses 42. After the volume of the oil in the downstream recess 42 is increased, the oil flows from the large-diameter circular portion 43A and the small-diameter circular portions 43B and 43C into the large-diameter circular portion 43A of a further downstream one of the recesses 42, thereby causing the flow of the oil to be chocked to generate a high dynamic pressure.

Therefore, when the piston 7 moves downward, an increased thickness of an oil layer is created between the central skirt portion 37 and the inner wall 6a of the cylinder bore 6.

As apparent from the above discussion, each of the recesses 41 and 42 function to retain a given amount of oil therein and also exert pressure to the retained oil to urge the piston 7 away from the cylinder bore 6.

The piston 7 in this embodiment is, as described already, equipped with the skirts 10 and 11 which are shaped to have a curvature increasing from the circumferential center portions 10c and 11c to the side walls 12 and 13 in the circumferential direction of the piston 7. The circumferential center portion 10c of the skirt 10 has formed therein the vertically long recesses 41 elongated in the axial direction of the piston 7 and the horizontally long recesses 42 which are located outside the vertically long recesses 41 in the circumferential direction of the piston 7. The skirt 11, like the skirt 10, has the recesses 41 and 42 formed therein.

The recesses 41, therefore, work to enhance the dynamic pressure in a region where a clearance between each of the circumferential center portions 10c and 11c of the skirt 10 and the inner wall 6a of the cylinder bore 6 is small.

It is also possible to increase a flow rate of oil in a small clearance region where the clearance between each of the circumferential center portions 10c and 11c of the skirt 10 and the inner wall 6a of the cylinder bore 6 is small to be higher than that in a large clearance region where a clearance between a portion of each of the skirts 10 and 11 which is located away from the circumferential center portion 10c or 11c of the skirt 10 or 11 toward the side wall 12 or 13 and the inner wall 6a of the cylinder bore 6 is large.

The higher flow rate of oil serves to attract the lower flow rate of oil to the small clearance region, thereby collecting a large amount of oil in a gap between the central skirt portion 37 and the inner wall 6a of the cylinder gore 6 which have a small clearance, but a large contact surface between itself and the inner wall 6a of the cylinder bore 6, thereby enhancing the lubrication between the piston 7 and the inner wall 6a of the cylinder bore 6 when the piston 7 moves vertically and also reducing the friction loss of the piston 7.

The amount of oil in the large clearance region where the clearance between each of the skirts 10 and 11 and the inner wall 6a of the cylinder bore 6 is large is larger than that in the small clearance region. Too large a thickness of an oil film in the large clearance region will, therefore, cause the piston 7 to undergo a viscosity resistance of the oil. It is, thus, advisable that a lower level of dynamic pressure be generated in the large clearance region than the small clearance region.

The piston 7 in this embodiment is designed to have the horizontally long recesses 42 in the large clearance region where the clearance between the skirt 10 and the inner wall 6a of the cylinder bore 6 is large, thereby generating a required level of dynamic pressure to avoid an excessive thickness of the oil film although the recesses 41 and 42 have the same configuration.

The recesses 41 which are located close to the upper boundary 37a in the upper skirt portion 36 of the piston 7 have the lower ends 41b arranged above the upper boundary 37a at the distance S away from the upper boundary 37a. The recesses 41 which are located closer to the upper boundary 37a in the central skirt portion 37 have the upper ends 41a arranged below the upper boundary 37a at the distance S away from the upper boundary 37a.

The recesses 41 which are located close to the lower boundary 37b in the lower skirt portion 38 of the piston 7 have the upper ends 41a arranged below the lower boundary 37b at the distance S away from the lower boundary 37b. The recesses 41 which are located closer to the lower boundary 37b in the central skirt portion 37 have the lower ends 41b arranged above the lower boundary 37b at the distance S away from the lower boundary 37b.

The above structure enhances the lubrication between the piston 7 and the inner wall 6a of the cylinder bore 6 and reduces the friction loss of the piston 7.

Specifically, a given area of a flat surface is required around the recesses 41 to convert the dynamic pressure into an oil film. If the recesses 41 are arranged on the upper boundary 37a or the lower boundary 37b, the oil will leak out of the recesses 41 on the upper boundary 37a or the lower boundary 37b in the circumferential direction of the skirts 10 and 11, thus not contributing to the growth of an oil film, which may increase the friction loss of the piston 7 with the inner wall 6a of the cylinder bore 6.

Figure 13:
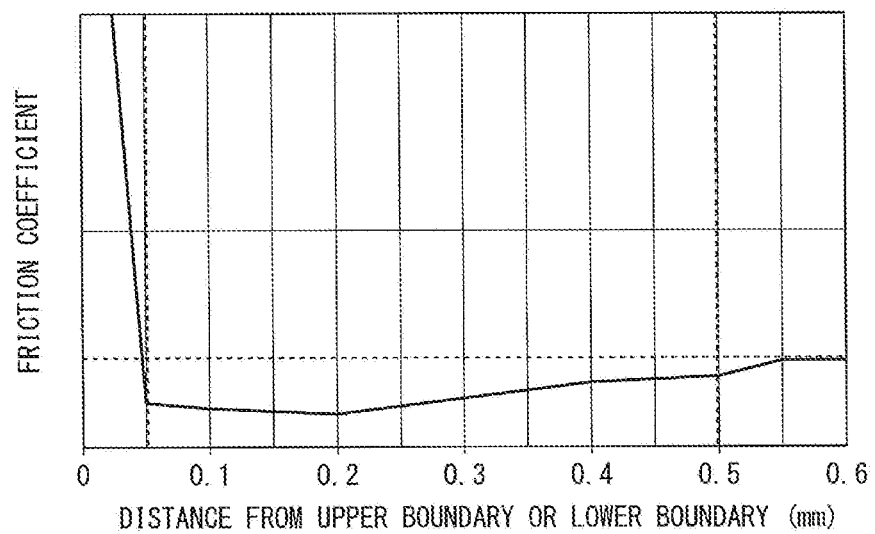
FIG. 13 is a view which represents a relation among an upper boundary, a distance from a lower boundary to ends of recesses, and a friction coefficient of a skirt of a piston for an internal combustion engine according to an embodiment of the invention.

FIG. 13 represents a relation between the distance S between the upper boundary 37a or the lower boundary 37b and the recesses 41 and the friction coefficient.

The graph of FIG. 13 shows that when the distance S between the recess 41 and the upper boundary 37a or the lower boundary 37b is 0.05 mm or less, the friction coefficient is increased with a decrease in volume of the oil film and that when the distance S is 0.05 mm, the friction coefficient is minimized, while when the distance s is more than 0.5 mm, the friction coefficient converges to a constant value.

In the piston 7 in this embodiment, the recesses 41 arranged close to the upper boundary 37a or the lower boundary 37b are located at a distance longer than 0.05 mm or more and shorter than 0.5 mm or less away from the upper boundary 37a or the lower boundary 37b.

It is, therefore, possible for the recesses 41 to have required oil retaining and dynamic pressure generating abilities. This improves the lubrication between the piston 7 and the inner wall 6a of the cylinder bore 6 and reduces the friction loss of the piston 7.

The upper skirt portion 36 and the lower skirt portion 38 are, as described above with reference to FIG. 6, shaped to have the first distance H1 and the second distance H2. The first distance H1 is a distance from the upper boundary 37a to a portion of the upper skirt portion 36 where the given radius decrease SS is created on the imaginary plane L3. The imaginary plane L3 is defined to extend parallel to the center axial direction C of the piston crown 9 and pass through the skirt 10. The first distance H1 is selected to be longer than the second distance H2 that is a distance from the lower boundary 37b to a portion of the lower skirt portion 38 where the radius decrease SS is created on the imaginary plane L3. This enhances the lubrication between the piston 7 and the inner wall 6a of the cylinder bore 6 and reduces the friction loss of the piston 7.

Specifically, when the piston 7 moves vertically, the volume of a lubricating oil film is increased by the dynamic pressure resulting from the wedge effect both in the gap between the portion of the upper skirt portion 36 located at the first distance H1 away from the upper boundary 37a and the inner wall 6a of the cylinder bore 6 and in the gap between the portion of the lower skirt portion 38 located at the second distance H2 away from the lower boundary 37b and the inner wall 6a of the cylinder bore 6. This further enhances the lubrication between the piston 7 and the inner wall 6a of the cylinder bore 6 and reduces the friction loss of the piston 7.

FIG. 14 represents a relation between the radius decrease SS (i.e., the size of the clearance between the inner wall 6a of the cylinder bore 6 and each of the skirts 10 and 11) and the dynamic pressure.

The graph of FIG. 14 shows that the dynamic pressure is maximized when the radius decrease SS is 0.002 mm, minimized when the radius decrease SS is 0.005 mm, and becomes zero when the radius decrease SS is 0.006 mm. It is, therefore, preferable that the radius decrease SS is selected to be less than or equal to 0.005 mm and more than or equal to 0.002 mm.

The first distance H1 is, as described above, selected to be longer than the second distance H2, thereby enhancing the wedge effects of the lubricating oil film between the upper skirt portion 36 and the inner wall 6a of the cylinder bore 6 even when the radius decrease of the lower skirt portion 38 is set greater than that of the upper skirt portion 36.

It is, therefore, possible to minimize a risk of a physical interference between the lower end of the lower skirt portion 38 and the inner wall 6a of the cylinder bore 6 arising from the inclination of the piston 7.

The piston 7 is designed to have the radius decrease SS of a portion of the central skirt portion 37 which lies on the imaginary plane L2 from that of the circumferential center portion 10c of the center skirt portion 37 in the circumferential direction of the skirts 10 and 11 to be, as described with reference to FIG. 14, in a range of less than or equal to 0.005 mm and more than or equal to 0.002 mm.

This enhances the wedge effects of the lubricating oil film between each of the skirts 10 and 11 and the inner wall 6a of the cylinder bore 6 in the circumferential direction of the skirts 10 and 11. This improves the lubrication between the piston 7 and the inner wall 6a of the cylinder bore 6 and reduces the friction loss of the piston 7.

Figure 15:
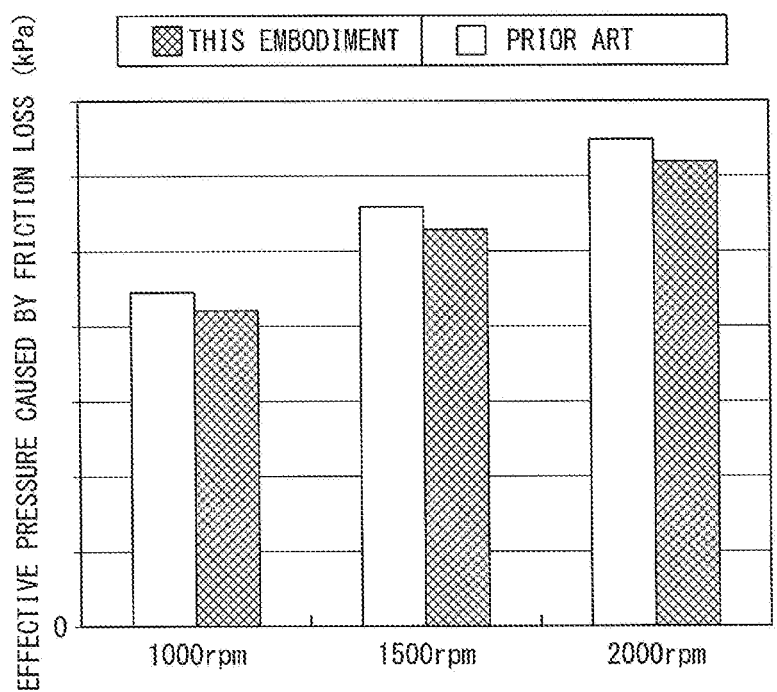
FIG. 15 is a view which represents results of measurement of friction losses of a piston for an internal combustion engine according to an embodiment of the invention and a prior art piston.

FIG. 15 represents results of evaluation tests of the friction loss of the aluminum-made piston 7 in this embodiment and a prior art piston when mounted in a three-cylinder gasoline 660 cc engine.

The results of the evaluation tests show that the piston 7 in this embodiment has a decreased friction loss at speeds of 1,000 rpm, 1,500 rpm, and 2,000 rpm of the engine as compared with the prior art piston.

Each of the recesses 41 and 42 is made up of the large-diameter circular portion 43A and the small-diameter circular portions 43B and 43C whose outer edges are in an arc-shape, but however, may alternatively have another shape, such as a vertically long or a horizontally long shape.

The engine 1 in this embodiment is, as described above, a transverse engine with the crankshaft 5 extending in the width-wise direction of the vehicle, but however, may be implemented by a longitudinally mounted engine with the crankshaft 5 extending in the longitudinal direction of the vehicle.

While the present invention has been disclosed in terms of the preferred embodiment in order to facilitate better understanding thereof, it should be appreciated that the invention can be embodied in various ways without departing from the principle of the invention. Therefore, the invention should be understood to include all possible modifications to the shown embodiment which can be embodied without departing from the principle of the invention as set forth in the appended claims.

What is claimed is:

1. A piston for an internal combustion engine comprising:
a piston body which is reciprocable relative to an inner wall of a cylinder bore;
a pair of skirts which extend downward from the piston body;
a pair of piston pin bosses which retains a piston pin;
a pair of side walls which connect the skirts together; and
resin-coated layers disposed on surfaces of the skirts which face the inner wall of the cylinder bore,
wherein each of the skirts includes a central skirt portion, an upper skirt portion, and a lower skirt portion, the central skirt portion being a central portion of the skirt in a center axial direction of the piston body, having a largest diameter, and also having a surface area extending parallel to a center axis of the piston body, the upper skirt portion being curved to have an outer diameter which gradually decreases from an upper boundary of the central skirt portion toward the center axis of the piston body above the upper boundary, the lower skirt portion being curved to have an outer diameter which gradually decreases from a lower boundary of the central skirt portion toward the center axis of the piston body below the lower boundary,
wherein each of the resin-coated layers has formed therein a plurality of recesses which retain oil therein,
wherein ones of the recesses which are arranged close to the upper boundary or the lower boundary are located at a given distance away from the upper boundary or the lower boundary, and
wherein the upper skirt portion and the lower skirt portion are shaped to have a first distance and a second distance, the first distance being a distance from the upper boundary to a portion of the upper skirt portion where a given value of the radius decrease is created on an imaginary plane, the imaginary plane being defined to extend parallel to the center axial direction of the piston body and pass through the skirt, and wherein the first distance is selected to be longer than the second distance that is a distance from the lower boundary to a portion of the lower skirt portion where the given value of the radius decrease is created on the imaginary plane.

2. A piston for an internal combustion engine as set forth in claim 1, wherein each of the skirts is shaped to have a curvature which increases from a circumferential center portion thereof toward joints with the side walls in a circumferential direction of the piston, wherein each of the recesses includes a vertically long recess elongated in the center axial direction of the piston body and a horizontally long recess elongated in the circumferential direction of the shirt, and wherein the vertically long recesses are arranged in the circumferential center portion of each of the skirts, and the horizontally long recesses are arranged closer to the side walls than the circumferential center portion.

3. A piston for an internal combustion engine as set forth in claim 1, wherein a radius decrease of each of the lower skirt portions from the lower boundary toward a center axis of the piston body is set larger than that of each of the upper skirt portions from the upper boundary toward the center axis of the piston body.

4. A piston for an internal combustion engine as set forth in claim 1, wherein the piston pin has a center axis extending perpendicular to the center axis of the piston body, and wherein the piston pin is arranged to have the center axis thereof located in a range where the upper skirt portions lie in the center axial direction of the piston body.

* * * * *